United States Patent [19]

Katzen et al.

[11] Patent Number: 5,198,400
[45] Date of Patent: * Mar. 30, 1993

[54] MIXED CHROMIUM CATALYSTS AND POLYMERIZATIONS UTILIZING SAME

[75] Inventors: Stanley J. Katzen, Buffalo Grove; Thomas J. Pullukat, Hoffman Estates; Michael W. Lynch, Schaumburg, all of Ill.; Louis J. Rekers, Wyoming, Ohio

[73] Assignee: Quantum Chemical Corporation, New York, N.Y.

[*] Notice: The portion of the term of this patent subsequent to Jan. 14, 2009 has been disclaimed.

[21] Appl. No.: 675,378

[22] Filed: Mar. 26, 1991

Related U.S. Application Data

[60] Continuation-in-part of Ser. No. 570,935, Aug. 22, 1990, Pat. No. 5,081,089, which is a division of Ser. No. 338,476, Apr. 14, 1989, Pat. No. 4,981,927, which is a continuation of Ser. No. 52,654, May 20, 1987, abandoned.

[51] Int. Cl.$^5$ ............................................... C08F 4/69
[52] U.S. Cl. ............................... 502/113; 502/117; 502/162; 502/120; 502/204; 502/210; 502/242; 502/256; 526/105; 526/106
[58] Field of Search ............ 502/117, 256, 162, 113, 502/120, 204, 210, 242

[56] References Cited

U.S. PATENT DOCUMENTS

| | | |
|---|---|---|
| 3,622,521 | 11/1971 | Hogan et al. ..................... 502/167 |
| 3,984,351 | 10/1976 | Rekers et al. .................. 502/117 X |
| 3,985,676 | 10/1976 | Rekers et al. .................. 502/117 X |
| 4,263,422 | 4/1981 | Lowery et al. ................. 502/113 X |
| 4,295,997 | 10/1981 | McDaniel et al. .............. 502/256 X |
| 4,454,242 | 6/1984 | Ikegami et al. ...................... 502/113 |
| 4,540,757 | 9/1985 | McDaniel ....................... 502/120 X |
| 4,560,733 | 12/1985 | Martin et al. .................. 502/120 X |
| 5,081,089 | 1/1992 | Rekers et al. ....................... 502/117 |

Primary Examiner—Patrick P. Garvin
Attorney, Agent, or Firm—Kenneth D. Tremain; Gerald A. Baracka

[57] ABSTRACT

Mixed catalyst compositions comprised of a first supported chromium-containing catalyst component and a second supported chromium-containing catalyst component and which additionally have one or more metallic or non-metallic catalytic agents associated therewith are provided. The additional metallic or non-metallic elements associated with the catalyst components can be aluminum, titanium, zirconium, boron, phosphorous or combinations thereof. The pore volume of the silica supports used for the first and second catalyst components differs by at least 0.3 cc/g. The mixed catalyst compositions of the invention are useful for the preparation of polyolefins. They are particularly useful of polymerization of ethylene in particle form polymerizations to produce high density polyethylene blow molding resins having good processability and physical properties. The improved particle form polymerization process and products obtained thereby using the above-described mixed catalyst compositions are also described.

30 Claims, No Drawings

MIXED CHROMIUM CATALYSTS AND POLYMERIZATIONS UTILIZING SAME

CROSS-REFERENCE TO RELATED APPLICATIONS

This is a continuation-in-part of application Ser. No. 570,935 filed Aug. 22, 1990 and now U.S. Pat. No. 5,081,089 which is a division of application Ser. No. 338,476 filed Apr. 14, 1989, now U.S. Pat. No. 4,981,927, which is a continuation of application Ser. No. 052,654 filed May 20, 1987, abandoned.

BACKGROUND OF THE INVENTION

1. Field of the Invention

This invention relates to improved catalyst compositions and processes for utilizing same. The mixed chromium catalysts are useful for polymerizing olefins and, more particularly, for use in particle form polymerizations for the manufacture of high density polyolefin resins which exhibit high resistance to environmental stress cracking and which are useful for the production of blow molded articles. More specifically, the mixed catalysts are comprised of a first and second chromium-containing supported catalyst component wherein the supports used for said first and second catalyst components have different pore volumes and wherein at least one of the catalyst components contains an additional element selected from aluminum, titanium, zirconium, boron or phosphorus.

2. Description of the Prior Art

In the selection and production of resins for the manufacture of blow molded goods, more so than with other fabrication methods, a careful balance must be struck between the physical properties of the solid resin and the processing characteristics of the resin melt if efficient production of durable molded articles is to be achieved. While many resins have superior physical properties, they do not have acceptable rheological (viscoelastic) properties under conditions of flow and shear such as are encountered during blow molding. Conversely, other resins which exhibit satisfactory viscoelastic behavior are deficient in one or more essential physical characteristics. For this reason there is a continuing effort to develop resins which have an optimal balance of physical and rheological properties. This is especially true with polyethylene resins used for the manufacture of blow molded bottles.

Improved processability of polyolefin resins, i.e., improved flow properties and shear response, is obtained by increasing the molecular weight distribution of polymers. This has been accomplished by blending separately prepared polymers of different molecular weights and by utilizing catalyst systems capable of directly producing polymers having broadened molecular weight distributions. U.S. Pat. Nos. 3,959,178 and 4,025,707, for example, disclose the preparation of ethylene homopolymers and copolymers of broadened molecular weight obtained utilizing a mixed catalyst comprising several portions of the same or different chromium components and metal promoted variations thereof wherein each portion is activated at a different temperature. U.S. Pat. Nos. 4,540,757 and 4,560,733 utilize milled blends of at least two different silica-containing components having different melt index potentials for the preparation of titanium-containing catalysts components.

U.S. Pat. No. 4,263,422 discloses polymerizing α-olefins utilizing dual independently supported catalysts one of which is an inorganic halide supported titanium and/or vanadium Ziegler type catalyst while the other is an inorganic oxide supported chromium-containing catalyst.

While it has been possible to improve processing characteristics in this manner, any processing advantage has heretofore been offset in large part by a corresponding decrease in one or more essential physical properties. For example, while the products obtained in accordance with U.S. Pat. No. 4,025,707 have good die swell characteristics and acceptable environmental stress crack resistance and flow properties, polymer densities are too low to provide the necessary stiffness for blown bottles. On the other hand, polymers such as those produced using the catalysts of U.S. Pat. No. 4,560,733 have sufficiently high densities (0.960 and higher) but typically are deficient in their resistance to environmental stress cracking.

For blow molding bottles, the resin must have sufficiently high density and high resistance to environmental stress cracking in addition to having acceptable processing characteristics. A density of at least 0.957 is necessary to obtain the high degree of stiffness required by molders. It is considered even more desirable for the resin to have a density of 0.958 to 0.961. Stiffness imparts strength to bottles and also makes thinner wall constructions possible. More units can thus be produced per pound of resin, generally referred to within the industry as "lightweighting," which represents an economic advantage for the processor. Lightweight resins must also exhibit a high degree of resistance to cracking under environmental stress, that is, while being stretched or bent in several directions at once.

While stiffness increases with density as noted above, an inverse relationship exists between density and resistance to environmental stress cracking. As density is increased, resistance to environmental stress cracking is reduced. Both of the above relationships assume that the melt index of the resins are the same or essentially the same. A balance must therefore be struck between the density, i.e., stiffness, of the resin and the resistance of the resin to environmental stress cracking.

It would be advantageous if the molecular weight distribution of polymers could be varied and if polyethylene resins having an optimal balance of rheological and physical properties could be produced. It would be even more desirable if high density resins having high resistance to stress cracking useful for the manufacture of blown bottles could be obtained utilizing mixtures of known catalyst components. These and other advantages are realized using the mixed catalyst compositions of the present invention which are described in detail to follow.

SUMMARY OF THE INVENTION

It is an object of the present invention to provide catalysts which are capable of producing useful polyethylene resins having a desirable balance of processability and physical properties. It is a further object to produce readily processable high density blow molding resins useful for the production of blown bottles. These and other objectives are accomplished utilizing mixed chromium catalyst compositions comprised of a first supported chromium-containing catalyst component and a second supported chromium-containing catalyst component wherein the pore volumes of the silica supports utilized for said catalyst components differs by at least 0.3 cc/g.

More specifically, the mixed chromium catalyst compositions of the present invention consist essentially of a first and second silica-supported chromium catalyst component; said first and second catalyst components present at a weight ratio from 10:1 to 1:10 and each containing from 0.1 to 2.0 weight percent chromium with at least one of said catalyst components containing an additional metallic or non-metallic element selected from aluminum, titanium, zirconium, boron or phosphorus. The silica supports of said first and second catalyst components differ in pore volume by at least 0.3 cc/g and, most usually, the pore volume of the silica support of the first catalyst component is greater than 1.0 cc/g.

In a particularly useful embodiment of the invention the pore volume of the silica support used for the first catalyst component is from 1.7 to 3.1 cc/g and the pore volume of the silica support used for the second catalyst component is from 1.0 to 2.0 cc/g. The weight ratio of the first and second catalyst components will more preferably range from 5:1 to 1:5 and the metallic and non-metallic element(s) are usually present in amounts from 0.1 to 6.0 weight percent. Especially useful mixed catalysts of the invention contain from 2 to 4.5 weight percent aluminum, titanium or zirconium and, when a non-metal is present, from 0.1 to 1.0 weight percent phosphorous or boron.

In another particularly advantageous embodiment, the individual catalyst components or a mixture of the catalyst components are thermally activated by heating in a non-reducing atmosphere at a temperature from 450° F. to 1700° F. It is even more useful if, prior to the thermal activation, the individual catalyst component or mixture thereof is heated at 575° F. to 1650° F. in a reducing atmosphere—preferably a mixture of nitrogen and carbon monoxide. The mixed chromium compositions are effective catalysts for the polymerization of olefins by themselves or, as is more generally the case, in combination with metallic or non-metallic reducing agents such as trialkyl aluminums, alkyl aluminum halides, alkyl aluminum alkoxides, dialkyl zincs, dialkyl magnesiums, alkali metal borohydrides, aluminum borohydrides, alkyl boranes, and boron hydrides.

DETAILED DESCRIPTION

In accordance with the present invention, polyethylene resins having good processing characteristics, high density and high resistance to environmental stress cracking are obtained using mixed chromium catalysts obtained by combining two or more different supported chromium-containing catalyst components. The catalyst components which are mixed to obtain the present catalyst compositions will differ based on the support material used and may also differ based on the type and/or amount of catalytic agent associated therewith. Whereas the individual chromium-containing catalyst components may be known, it has unexpectedly been discovered that by combining certain of these catalyst components in specific ratios the resulting mixed catalysts yield resins which, in addition to having excellent processing characteristics by virtue of a broadened molecular weight distribution, also have high densities and high resistance to environmental stress cracking. This balance of desirable processability with both high density and high resistance to stress cracking makes the resins highly useful in blow molding applications and particularly for the production of blown bottles.

Polyethylene resins having densities of at least 0.957, high environmental stress cracking resistance (ESCR), and acceptable flow properties and shear response are obtained using the present improved catalyst compositions which are mixtures of first and second chromium-containing silica-supported catalyst components wherein the silica supports for said catalyst components differ in pore volumes by at least 0.3 cc/g and at least one of the catalyst components contains an additional metallic or nonmetallic element selected from aluminum, titanium, zirconium, boron or phosphorus. These catalytic metallic and nonmetallic elements, also referred to herein as catalytic agents, will be deposited on and associated with the support material in accordance with conventional practice. More particularly, resins produced in accordance with the present invention have densities from 0.958 to 0.961 and ESCR values greater than 8 hours and, more preferably, greater than 10 hours. ESCR values referred to herein are bottle ESCR F50 values as determined in accordance with ASTM D-2561, Procedure C (modified), unless otherwise indicated.

In addition to having densities and bottle ESCRs within the above-specified ranges, the resins also typically have melt indexes (pellet) from 0.1 to 0.7 and, more particularly, in the range 0.2 to 0.4 and melt index ratios (MIRs) in the range 60 to 180 and, more preferably, 80 to 125. MIR is generally considered to be an approximation of molecular weight distribution and is the ratio between the high load melt index (HLMI) determined in accordance with ASTM D1238-57T, condition F, and the MI determined in accordance with ASTM D1238-57T, condition E. In general, with resins of comparable MI, polymers with broader molecular weight distributions have higher MIRs and better flow properties than their lower MIR counterparts.

While it is generally recognized that rheological properties can be modified by varying the support material used for a particular catalyst and that the melt index is affected by the pore volume of the silica support, it is unexpected the above-described highly desirable balance of rheological and physical properties can be obtained by the use of mixed catalysts based on two different chromium-containing components. Heretofore, any processing advantages which have been realized were generally accompanied by a corresponding undesirable reduction in density and/or ESCR.

The catalyst compositions of the present invention are mixtures of two discreet supported catalyst components present in defined ratios. Both catalyst components employed for the improved mixed catalyst compositions of the invention necessarily have chromium on a support. Additionally, one or both of the catalyst components may also have other metals/nonmetals deposited thereon.

Silica is utilized as the support for the two catalyst components, however, the silica employed for the first catalyst component and the silica used for the second catalyst component will differ in pore volumes by at least 0.3 cc/g. The weight ratio of the first and second supported catalyst component in the mixture ranges from 10:1 to 1:10 and, more preferably, from 5:1 to 1:5. In a particularly useful embodiment the weight ratio of the two catalyst components comprising the mixture is from 3:1 to 1:3.

The silica support employed for the first catalyst, referred to herein as the higher pore volume support, will have a pore volume greater than 1.0 cc/g. This higher pore volume support more usually has a pore volume of 1.7 cc/g or above and in a particularly useful embodiment the pore volume is greater than 2.0 cc/g. In general, the pore volume will not exceed about 3.1 cc/g. Silica supports of this type are well known and can be obtained in accordance with known procedures. For example, silica xerogels having the prescribed pore volumes are described in U.S. Pat. Nos. 3,652,214, 3,652,215 and 3,652,216, details of which are incorporated herein by reference.

Especially useful high pore volume silicas for the catalysts of this invention have pore volumes from 2.1 cc/g to 2.9 cc/g. These high pore volume materials typically have surface areas in the range 100 to 800 m$^2$/g and, more preferably, in the range 200 to 500 m$^2$/g.

The silica support employed for the second catalyst component, referred to herein as the lower pore volume support, will have a pore volume at least 0.3 cc/g less than the higher pore volume support employed for the first catalyst component. In general, the pore volume of these silicas can range from 0.3 to 2.6 cc/g but, more usually, will range from 1.0 to 2.0 cc/g. It is particularly advantageous if the second catalyst component is supported on a silica support having a pore volume from 1.5 cc/g to 1.9 cc/g.

While granular silica supports are most commonly used, microspheroidal silicas can be advantageously utilized as the support material for either or both catalyst components. Silica xerogels of this later type are obtained by conventional methods known to the art such as described in U.S. Pat. No. 3,453,077, and are commercially available from Davison Chemical Division, W. R. Grace & Co., under the designation MS-952. Microspheroidal silica of pore volume 1.6 cc/g to 1.8 cc/g is most advantageously employed as the lower pore volume support for the second catalyst component.

Either or both of the silica supports can be calcined prior to having the metal deposited thereon. If calcining is employed prior to deposition, it can be carried out at temperatures ranging from about 200° F. to about 1800° F. in accordance with conventional procedures. In one particularly useful embodiment of the invention the higher pore volume silica support used for the first catalyst component is calcined before deposition.

Known chromium-containing compounds capable of reacting with the surface hydroxyl groups of the silica supports can be utilized to effect deposition of the chromium thereon. Examples of such compounds include chromium nitrate, chromium trioxide, organochromium compounds, including chromocene, chromate esters such as chromium acetate, chromium acetylacetonate and t-butyl chromate, silyl chromate esters, phosphorus-containing chromate esters, and the like.

When an additional catalytic agent, metal or nonmetal, is present on either the first or the second catalyst component it can be deposited in the conventional manner. For example, a compound of the metal or nonmetal can be included with the chromium compound during the chromium deposition or, after the chromium deposition is complete, any additional catalytic agents can be deposited in a separate step. It is also possible to utilize a chromium compound or complex containing additional catalytic elements. This latter procedure is especially useful where phosphorus or boron are to be deposited on either the first or second catalyst component. Most notable in this regard is the use of organophosphoryl chromium compounds of the type disclosed in U.S. Pat. No. 3,985,676.

Known aluminum-containing compounds capable of reacting with the surface hydroxyl group of the silica supports can be employed to deposit the aluminum thereon. Examples of such aluminum compounds include aluminum alkoxides, such as aluminum sec-butoxide, aluminum ethoxide, aluminum isopropoxide; alkyl aluminum alkoxides, such as ethyl aluminum ethoxide, methyl aluminum propoxide, diethyl aluminum ethoxide, diisobutyl aluminum ethoxide, etc.; alkyl aluminum compounds, such as triethyl aluminum, triisobutyl aluminum, etc.; alkyl or aryl aluminum halides, such as diethyl aluminum chloride; aryl aluminum compounds, such as triphenyl aluminum; aryloxy aluminum compounds, such as aluminum phenoxide; and the like. While the aluminum may be deposited on either the first or second component of the mixed catalyst, it is preferably associated with the first catalyst component and supported on the high pore volume silica.

Compounds which can be utilized to incorporate titanium and zirconium metal with the support include titanates and zirconates of the formula

$(R)_n Me(OR)_m$ where Me is titanium or zirconium; R is a hydrocarbon radical selected from alkyl, cycloalkyl, aryl, aralkyl or alkaryl having from 1-12 carbon atoms; m is an integer from 1 to 4, n is an integer from 0 to 3 and m plus n is equal to 4; and titanium or zirconium halides of the formula

$MeX_4$ where Me is titanium or zirconium and X is chlorine, bromine, fluorine or iodine. Compounds of the above types wherein R is a $C_{1-7}$ alkyl group and X is chlorine are particularly useful. In an even more advantageous embodiment of the invention the titanium and zirconium compounds are represented by the formula

$Me(OR_1)_4$ where Me is the same as defined above and $R_1$ is a $C_{1-7}$ alkyl group, for example, tetraethyl titanate, tetraisopropyl titanate, tetraisopropyl zirconate, tetrabutyl titanate, etc. These latter compounds, also sometimes referred to as titanium tetraethoxide, titanium tetraisopropoxide, zirconium tetraisopropoxide and titanium tetrabutoxide, respectively, are conveniently deposited on support materials by deposition from hydrocarbon solutions. Tetraisopropropyl titanate and tetraisopropyl zirconate are especially preferred.

Titanium and zirconium acetylacetonate compounds, such as titanyl acetylacetonate and titanium diacetylacetonate diisopropylate, can also be used to deposit these metals.

Boron is conveniently deposited utilizing an alkyl ester of boron wherein the alkyl group contains from 1 to 7 carbon atoms, such as trimethyl borate and triisopropyl borate, or a halide of boron.

Phosphorus compounds which can be used to effect deposition are most commonly phosphate esters which correspond to the formulas

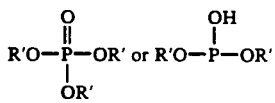

where R is a hydrocarbon radical selected from alkyl, cycloalkyl, aryl, aralkyl and alkaryl having from 1 to 12 carbon atoms. Trialkyl phosphates where the alkyl group contains from 1 to 7 carbon atoms, such as triethyl phosphate, are particularly useful.

The first and second components which comprise the mixed catalysts of the invention are obtained by depositing the chromium-containing compound and any additional catalytic agents on the silica support in accordance with conventional known procedures, e.g., vapor coating or deposition from inert organic solvents. Organic solvents which can be employed for this purpose typically include hydrocarbons and their halogenated derivatives. Dichloromethane has been found to be a particularly effective solvent for depositing chromium and aluminum compounds on the supports.

The same or different chromium-containing compounds may be used for preparation of the first and second catalyst components. When preparing catalyst components having chromium and one or more other elements the order of deposition may be varied where separate steps are employed. Furthermore, after the first deposition the support having the metal deposited thereon may be heat activated before proceeding with subsequent depositions.

In general, the first and second catalyst components can contain from about 0.1 to 2.0 weight percent chromium. More usually, however, the amount of chromium will range from 0.2 to 1.5 weight percent and in a particularly useful embodiment from 0.5 to 1.25 weight percent. Additional metal and nonmetal catalytic agents will be present from 0.1 to 6.0 weight percent and, more preferably, from 0.2 to 4.0 weight percent.

More specifically, when a metallic catalytic agent is employed in conjunction with the chromium, such as when titanium, zirconium or aluminum are present, these metals will constitute from 0.5 to 6.0 weight percent and, more preferably, 1.0 to 4.0 weight percent of the catalyst-component. Nonmetallic co-catalytic agents, when present on either the first or second catalyst component, will generally range from 0.1 to 1.5 weight percent and, more usually, from 0.2 to 1.0 weight percent. In a highly useful embodiment of the invention, the first catalyst component contains from 0.5 to 1.2 weight percent chromium, the second catalyst component contains from 0.75 to 1.25 weight percent chromium, and aluminum is associated with the first higher pore volume catalyst component and is present in an amount from 2 to 4.5 weight percent. In all of the foregoing instances, the recited weight percentages are based on the total weight of the catalyst component.

The first and second catalyst components comprising the mixed catalyst compositions of this invention are thermally activated by heating at a temperature below the decomposition temperature of the support material in a non-reducing atmosphere. The heat activation may be carried out before the first and second catalyst components are combined or after the first and second catalyst components have been combined. Temperatures generally employed for this activation range from about 450° F. up to about 1700° F. but higher activation temperatures can be utilized provided the decomposition temperature of the support material is not exceeded. When the first and second catalyst components are combined and co-activated by heating the mixture of the catalyst, temperatures from about 950° F. to 1500° F. are preferably used. When the first and second catalyst components are separately heat activated, temperatures from 950° F. to 1650° F. are most advantageously employed. In the latter situation, the catalyst components may be heat activated at different temperatures within the above-recited range. Also, multiple heat activation steps may be carried out. For example, after the first compound is deposited on the support and before proceeding with deposition of the second a heat activation operation may be carried out. Similarly, after deposition of the second compound, a second heat activation operation may be conducted or the catalytic material may be directly combined with the other catalyst component and this mixture then heat activated.

A non-reducing atmosphere, preferably, an oxygen-containing atmosphere is necessarily employed for thermal activation. The time required will vary but generally ranges from about 30 minutes up to about 24 hours and, more preferably, from 2 to 12 hours. If the first and second catalyst components are separately heat activated, the temperatures employed and times of activation may be different for each. The non-reducing atmosphere, which is preferably air or other oxygen-containing gas, should be essentially dry. When air is used, it is preferably dehumidified to less than 3 ppm water.

In a particularly useful embodiment of this invention, the thermal activation is preceded by heating the individual catalyst components or the mixed catalyst composition at a temperature from about 575° F. to 1650° F. in a reducing atmosphere for a period of time which can range from several minutes up to several hours. Preferably the reducing atmosphere consists of a mixture of an inert gas with a reducing gas. Such procedures are described in U.S. Pat. No. 4,041,224. Preferably, the inert gas is nitrogen and the reducing gas is carbon monoxide and the temperature is between about 1000° F. and 1400° F. Following this reductive treatment step, the catalyst is then subjected to thermal treatment in the non-reducing gas in accordance with the previously described procedure. Where a reducing step is employed prior to activation in a non-reducing atmosphere, the latter step is preferably carried out at a temperature from about 800° F. to 1100° F.

The mixed catalysts of the invention are effective to polymerize olefins by themselves or in combination with metallic and/or non-metallic reducing agents. Examples of metallic reducing agents which can be used include trialkyl aluminums, such as triethyl aluminum and triisobutyl aluminum, alkyl aluminum halides, alkyl aluminum alkoxides, dialkyl zincs, dialkyl magnesiums, and borohydrides including those of the alkali metals especially sodium, lithium and potassium, and aluminum. Non-metal reducing agents which can be used include alkyl boranes such as triethyl borane, triisobutyl borane, and trimethyl borane and hydrides of boron such as diborane, pentaborane, hexaborane and decaborane. The mixed catalyst may be combined with the metallic or non-metallic reducing agent prior to being fed to the polymerization vessel or the mixed catalyst and reducing agent may be separately fed to the polymerization reactor. The molar ratio of the metal or non-metal of the reducing agent to chromium can range from 0.01:1 to 10:1 and, more preferably, is in the range 0.01:1 to 5:1. In a particularly advantageous embodiment, the molar ratio of metal or non-metal to chromium is from 0.01:1 to 2:1.

In one embodiment of the invention particularly useful polyethylene resins having a good balance of physical and rheological properties useful for the manufacture of blow molded bottles are produced utilizing a mixed catalyst composition wherein the first catalyst component contains from 0.5 to 1.2 weight percent chromium and from 0.2 to 1.0 weight phosphorus obtained by depositing an organophosphoryl chromium compound and 2 to 4.5 weight percent aluminum obtained by depositing an aluminum alkoxide compound, said compounds being deposited on a silica support having a pore volume from 2.1 cc/g to 2.9 cc/g. It is especially advantageous if the high pore volume silica support is calcined at 1200° F. to 1700° F. prior to deposition of the chromium and aluminum compounds.

Chromium/aluminum-containing catalysts of this type are known and described in U.S. Pat. No. 3,984,351, details of which are incorporated herein by reference. In general, they are obtained by depositing an organophosphoryl chromium compound which is the reaction product of chromium trioxide and an organophosphorus compound of the formula

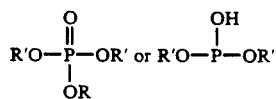

wherein at least one of the R' groups is a hydrocarbon radical selected from alkyl, cycloalkyl aryl, aralkyl, or alkaryl. Any R' groups which are not hydrocarbon radicals are hydrogen. Preferred organophosphorus compounds are trialkyl phosphates such as triethyl phosphate. The aluminum alkoxide compounds correspond to the formula

where R" is an alkyl having from 1 to 8 carbon atoms or aryl, aralkyl, or alkaryl having from 6 to 8 carbon atoms. Aluminum sec-butoxide, aluminum isopropoxide, aluminum ethoxide, and aluminum phenoxide are representative aluminum alkoxides and aluminum sec-butoxide is particularly advantageous.

Especially advantageous results are obtained when the above-described first catalyst component is used in conjunction with a second catalyst component containing from 0.75 to 1.25 weight percent chromium obtained by depositing a chromate ester on a microspheroidal silica support having a pore volume from 1.6 cc/g to 1.8 cc/g. Chromium acetate is a particularly useful chromate ester. Synthetic microspheroidal (amorphous) silica xerogels impregnated with chromium acetate are commercially available, e.g., EP30 Polyolefin Catalyst from Crosfield Catalysts. It is even more desirable if a trialkyl borane reducing agent is included in the polymerization with the above-described components and when the molar ratio of the boron of the reducing agent to chromium ranges from 0.1:1 to 1.5:1.

In another highly useful embodiment the above-described higher pore volume catalyst component contains chromium and titanium and, optionally, phosphorus. These catalyst components are effective when employed in conjunction with the above-described second catalyst components obtained by depositing chromium acetate on microspheroidal silica but are particularly advantageous when used with a catalyst component based on the lower pore volume support and having titanium or zirconium deposited with the chromium. In an even further and more preferred embodiment, mixed catalyst compositions which contain zirconium or titanium by virtue of having these metals deposited with the chromium on either the first or second catalyst component are thermally activated utilizing the two step procedure wherein the catalyst is first heated in a reducing atmosphere of carbon monoxide and subsequently in a non-reducing atmosphere of air. When zirconium and/or titanium are employed they are generally present from about 2 to 4 weight percent and if phosphorous is employed it generally is present from about 0.1 to 1.0 weight percent.

While the catalyst compositions of the present invention find general utility for the polymerization of olefins to produce homopolymers and copolymers in the density range 9.10 to about 9.70, they are most advantageously employed for the preparation of ethylene homo- and copolymer resins which have a desirable balance of rheological and physical properties making them useful for blow molding applications. Resins produced in accordance with the invention are primarily used for blow molding bottles, especially detergent bottles, bleach bottles and milk bottles, but can also be used for the production of larger articles, such as blow-molded drums and tanks. Resins obtained using the present improved mixed catalyst compositions are also useful for films. For example, high molecular weight film resins suitable for grocery sacks and merchandise bags and medium molecular weight resins for use in cereal liners and snack packs can also be produced using the mixed catalysts of the invention.

Utilizing the above-described preferred mixed catalysts, it is possible to produce highly processable, high density polyethylene resins which have high resistance to environmental stress cracking. For example, polyethylene resins having densities in the range 0.958 to 0.961 and ESCRs greater than 10 hours with melt indexes in the blowmolding range of 0.1 to 0.7 and melt index ratios from 80 to 125 are readily produced. By judicious selection of the various catalyst parameters discussed above it is possible to produce resins having acceptable stiffness with melt indexes from 0.2 to 0.4 and to achieve even further broadening of the molecular weight distribution, i.e., higher MIRs. In some instances the production of bimodal resins is even possible. It is an especially desirable feature of this invention that these aforementioned highly useful polyethylene resin products can be obtained using mixed catalysts without the necessity of separately heat activating the first and second catalyst components. This feature is an extremely useful and beneficial aspect of the invention from a commercial point of view since it eliminates a step in the catalyst preparation.

The mixed catalyst compositions can be used in virtually any polymerization procedure where supported catalysts are utilized. This incudes both gas phase (fixed and fluidized bed) polymerizations and solution polymerizations. They are, however, primarily used for the polymerization of ethylene in conventional particle form (slurry) processes. Such procedures are well known and are described in the prior art, e.g., U.S. Pat. No. 3,644,323. In general these polymerizations are carried out in a liquid organic medium at a temperature from about 150° F. to 230° F. The catalyst is suspended in the organic medium and the reaction is conducted at a pressure sufficient to maintain the organic diluent and at least a portion of the olefin in the liquid phase. Weight percent ethylene in the reactor is generally maintained from about 1.5 up to about 7. Hydrogen is generally added to the polymerization reaction for molecular weight control. The molar ratio of hydrogen to ethylene in the reactor is generally maintained between 0.25 and 1.0. While not necessary for polymerization, a metallic or non-metallic reducing agent of the type previoulsy defined is generally included in polymerizations with the mixed catalysts of this invention.

The organic medium employed for the polymerization is generally a paraffinic and/or cycloparaffinic material such as propane, butane, isobutane, pentane, isopentane, cyclohexane, methylcyclohexane, and the like. The medium is chosen so that under the conditions employed the polymer is insoluble in the medium and is readily recoverable in the form of solid particles. Isobutane is a particularly advantageous organic medium for the purpose of these polymerizations. Pressures typically range from about 100 to 800 psig and catalyst concentrations can range from about 0.001 to about 1 percent, based on the total weight of the reactor contents. These slurry polymerizations can be conducted as batch, continuous or semi-continuous operations.

The following examples illustrate the invention more fully. They demonstrate the ability to produce a wide range of readily processable polyethylene resins having high densities and high resistance to environmental stress cracking. Unless otherwise indicated, all parts and percentages are on a weight basis.

EXAMPLE I

A mixed catalyst was prepared in accordance with the present invention and utilized for the polymerization of ethylene. The catalyst consisted of a mixture of a supported chromium/ aluminum catalyst prepared in accordance with the procedure of U.S. Pat. No. 3,984,351, identified as Catalyst Component A, and a supported chromium catalyst obtained from commercial sources, identified as Catalyst Component B.

Catalyst Component A was prepared by calcining a high pore volume silica support at 1650° F. for 6 hours and thereafter impregnating first with the reaction product of $CrO_3$ and triethyl phosphate and then with aluminum sec-butoxide. Impregnations were made by deposition from dichloromethane solutions. The impregnated catalyst was then activated by placing it in a cylindrical container and fluidizing with dry air at 0.2 feet per minute lineal velocity while heating at 1070° F. for 6 hours. The resulting heat-activated catalyst had a pore volume of 2.3 cc/g and contained 1.0% chromium, 3.7% aluminum, and 0.6% phosphorus.

Catalyst Component B was a commercially obtained microspheroidal silica xerogel impregnated with chromium acetate which was activated by fluidizing with dry air at 0.2 feet per minute lineal velocity and heating at 1000° F. for 6 hours. The resulting heat-activated chromium catalyst had a pore volume of 1.7 cc/g and contained 1.0% chromium. Catalyst Components A and B were blended at a weight ratio of 3:1 to obtain the mixed catalyst.

Polymerization was carried out in a jacketed loop-type reactor provided with an agitator to cause circulation within the loop and create highly turbulent flow. Isobutane was employed as the hydrocarbon reaction medium. Means were provided to continuously feed isobutane, ethylene, a slurry of the mixed catalyst in isobutane, a solution of triethyl boron in isobutane and hydrogen to the reactor and for removing a mixture of the polymer, unreacted monomer, and diluent at a controlled rate. Polymerization details were as follows:

| | |
|---|---|
| Temperature (°F.) | 213 |
| Catalyst Concentration (g/kg isobutane) | 0.38 |
| Ethylene in Reactor (%) | 3.19 |
| $H_2$/Ethylene Molar Ratio | 0.49 |
| Boron/Chromium Molar Ratio | 0.24 |

After removal of ethylene and isobutane a free-flowing polyethylene powder having a density of 0.9599 and ESCR of 10.1 hours per ASTM D-2561, Procedure C was obtained. The resin had an MI of 0.26 and MIR of 119 and was readily fabricated using conventional blowmolding equipment into blown bottles.

The above polymerization was repeated except that the conditions were varied as follows:

| | |
|---|---|
| Temperature (°F.) | 212 |
| Catalyst Concentration (g/kg isobutane) | 0.40 |
| Ethylene in Reactor (%) | 2.97 |
| $H_2$/Ethylene Molar Ratio | 0.49 |
| Boron/Chromium Molar Ratio | 0.25 |

The resulting polyethylene resin had a density of 0.9595, ESCR of 10.5 hours, MI 0.20, and MIR of 122.

A useful high density resin was obtained even when the mixed catalyst was employed without triethyl borane reducing agent. For example, when ethylene was polymerized at 214° F. using a catalyst concentration of 0.73 g/kg isobutane with 3.81 weight percent ethylene and $H_2$/ethylene molar ratio of 0.35, a resin having a density of 0.9601, ESCR of 8.9 hours, MI of 0.26, and MIR of 130 was obtained. While the environmental stress crack resistance of the resin was somewhat lower than that obtained when triethyl borane is used, it nevertheless is considered to be within acceptable limits.

EXAMPLE II

To further demonstrate the ability to obtain high density resins having increased environmental stress crack resistance, a mixed catalyst was prepared by blending Catalyst Components A and B of Example I at a weight ratio of 1:1. The catalyst was employed for the polymerization of ethylene in accordance with the procedure of Example I under the following conditions:

| | |
|---|---|
| Temperature (°F.) | 212 |
| Catalyst Concentration (g/kg isobutane) | 0.41 |
| Ethylene in Reactor (%) | 2.17 |
| Hydrogen/Ethylene Molar Ratio | 0.89 |

The resulting polyethylene resin had a density of 0.9601 and ESCR of 11.4 hours. The MI and MIR of the resin were 0.26 and 110, respectively.

When the polymerization was repeated increasing the ethylene in the reactor to 2.82% and lowering the hydrogen/ethylene molar ratio to 0.69, a resin of density 0.9606, ESCR of 10.1 hours, MI of 0.24, and MIR of 118 was obtained.

EXAMPLE III

A chromium/aluminum/phosphorus catalyst, identified as Catalyst Component C, was prepared as described for Catalyst Component A in Example I except that the high pore volume silica support was not calcined prior to deposition of the chromium and aluminum compounds. After deposition of the chromium and aluminum compounds, Component C was air-dried and combined at a 1:1 weight ratio with a commercial chromium acetate impregnated microspheroidal silica xerogel (1.0% Cr; pore volume 1.7 cc/g). The mixture was then co-activated by fluidizing the mixture with dry air at 0.2 feet per minute lineal velocity and heating at 1100° F. for 6 hours. The resulting heat-activated mixed catalyst was employed for the polymerization of ethylene. Polymerization conditions and properties of the resulting resin-produced thereby were as follows:

| | |
|---|---|
| Temperature (°F.) | 218 |
| Catalyst Concentration (g/kg isobutane) | 0.40 |
| Ethylene in Reactor (%) | 4.0 |
| $H_2$/Ethylene Molar Ratio | 0.28 |
| Boron/Chromium Molar Ratio | 0.14 |
| Density | 0.9592 |
| ESCR (hours) | 12 |
| MI | 0.23 |
| MIR | 113 |

It is evident from the foregoing data that the product produced in accordance with the above-defined polymerization conditions has an excellent balance of physical and rheological properties which make it useful for blow molding applications. When the above-defined catalyst components are individually employed for the polymerization of ethylene under comparable polymerization conditions, resins having the desired balance of physical and rheological properties are not produced. For example, when high density resins having acceptable rheological properties are obtained, the stress crack resistance of the polymers is deficient.

EXAMPLE IV

To demonstrate the significant improvement obtained with the mixed catalyst compositions of this invention, polyethylene resin produced using a mixed catalyst was compared with resins produced using the individual catalyst components.

A supported catalyst containing chromium, aluminum and phosphorus was prepared in accordance with the general procedure described for Catalyst Component A in Example I using a high pore volume silica support (2.24 cc/g). The high pore volume silica was dried at 550° F. for two hours prior to deposition and then impregnated first with the reaction product of $CrO_3$ and triethyl phosphate and then with aluminum sec-butoxide. The depositions were made from dichloromethane solutions in accordance with the procedure described in U.S. Pat. No. 3,984,351. After drying the resulting supported catalyst (identified as IV(a)) had the following analysis: 0.90% Chromium; 3.70% Aluminum; and 0.54% phosphorus.

A supported catalyst containing chromium on a lower pore volume silica and corresponding to catalyst component B in Example I was employed as the second catalyst component and identified as IV(b). The catalyst was a commercially available microspheroidal silica xerogel impregnated with chromium acetate (1.0% Cr) purchased from Davison Chemical Division, W. R. Grace & Co. under the designation MS-952.

To obtain the mixed catalyst components IV(a) and IV(b) were combined in equal weight proportions and blended by fluidizing with dry air at 0.2 feet per minute lineal velocity. The resulting mixed catalyst, identified as IV(mc), was not analyzed since the metal values and pore volume are one-half of the sum of the values of the individual catalyst components.

Each of the above catalysts IV(a), IV(b), and IV(mc), was used to polymerize ethylene in the particle form polymerization process. Prior to polymerization each catalyst was heat-activated in a non-reducing atmosphere in accordance with the general practice, i.e., by fluidizing with dry air at 0.2 feet per minute lineal velocity and heating for a specified time. Conditions employed for the heat activation and polymerization with each of the above catalysts were selected to produce polyethylene resins suitable for blow molding having comparable densities (greater than 0.957) and comparable MIs (in the preferred range of 0.1 to 0.4). Polymerizations were then carried out in a production-scale jacketed loop reactor which was highly agitated to create circular highly turbulent flow within the loop. Isobutane was employed as the hydrocarbon reaction medium and, in accordance with the preferred practice for this type of polymerization, a co-catalyst (triethyl borane) and modifier (hydrogen) were employed. Heat activation details, polymerization details and properties of the polyethylene resins produced with each catalyst were as follows:

| | CATALYST IV(a) | CATALYST IV(b) | CATALYST IV(mc) |
|---|---|---|---|
| Heat Activation: | | | |
| Temp. (°F.) | 1200 | 1600[1] | 1100 |
| Time (hours) | 6 | 6 | 6 |
| Polymerization: | | | |
| Temp. (°F.) | .214 | 224 | 220 |
| Press (psig) | 650 | 650 | 650 |
| Catalyst Conc. (g/kg isobutane) | 0.40 | 0.38 | 0.19 |
| $C_2H_4$ in Reactor (wt. %) | 3.2 | 3.5 | 4.45 |
| $H_2/C_2H_4$ Molar Ratio | 0.36 | 0.08 | 0.28 |
| B/Cr Molar Ratio | 0.19 | 0.42 | 0.27 |
| % Solids | 41 | 39 | 38.5 |
| Polyethylene Resin: | | | |
| Density | 0.9595 | 0.9596 | 0.9592 |
| MI (pellet) | 0.36 | 0.34 | 0.28 |
| MIR | 95.5 | 98.5 | 107.7 |

[1]High activation temperature is required with this catalyst to produce a resin with MI in the desired range.

Standard blow molded containers (shampoo bottles) were produced using each of the above-identified resins and evaluated for environmental stress crack resistance in accordance with modified ASTM D-2561, Procedure C, Controlled Elevated Pressure Stress-Crack Resistance of a Specific Container to Polyoxyethylated Nonylphenol, a Stress-Cracking Agent. In this test the internal pressure is controlled at a constant elevated level. The shampoo bottles blow molded from the resins produced using Catalysts IV(a) and IV(b) failed after 8.5 and 10.5 hours, respectively, whereas the bottles formed from the resin produced using mixed catalyst IV(mc) ran for 19.8 hours before failure.

Blown containers produced using the above-identified polyethylene resins were also evaluated for column crush properties in accordance with ASTM D 2659-84. This test determines the mechanical properties of blown thermoplastic containers when loaded under columnar crush conditions at a constant rate of compressive deflection. For this evaluation the specimens tested were bleach bottles blow molded using 25±0.10 grams of the resin. Results were as follows:

| Resin Produced Using | CATALYST IV(a) | CATALYST IV(b) | CATALYST IV(mc) |
|---|---|---|---|
| Crushing Load at Failure (lbs) | 57.5 | 57.2 | 63.2 |

It is apparent from the above data that the increased column crush value obtained with the resin produced using the mixed catalyst IV(mc) would make it possible to lightweight the bleach bottles by 10 to 15 percent.

To further demonstrate the versatility of the invention and the ability to vary the catalyst components, a series of experiments were conducted using different mixed catalysts and are reported in the examples which follow. Catalyst components used to prepare the mixed catalysts referred to in Examples V–XII were as follows:

Catalyst Component A

As described in Example I containing 1.0% Cr, 0.6% P and 3.7% Al.

Catalyst Component B

As described in Example I containing 1.0% Cr.

Catalyst Component D

A commercially available chromium-containing catalyst (EP30 from Crosfield Catalysts—chromium acetate on silica having a pore volume of 1.6 cc/g) was additionally impregnated with boron. The boron was incorporated by adding trimethylborate to a slurry of chromium-containing catalyst in methylene chloride and evaporating the solvent. chromium and boron contents were 1.0% and 1.2%, respectively.

Catalyst Component E

Titanium was incorporated on the chromium-containing silica used for Catalyst Component D. Deposition was accomplished in the usual manner using tetrapropyltitanate and methylene chloride as the solvent. After drying, the catalyst component was analyzed and found to contain 1.0% Cr and 3.7% Ti.

Catalyst Component F

Silica (pore volume 2.3 cc/g) was calcined at 1650° F. for 6 hours and impregnated with the reaction product or $CrO_3$ and triethyl phosphate. Titanium was then deposited utilizing the slurry technique with tetrapropyltitanate and methylene chloride. Analysis of the dried catalyst component showed it to contain 1.0% Cr, 0.6% P and 3.7% Ti.

Catalyst Component G

A high pore volume silica (2.3 cc/g) was calcined and chromium acetylacetonate deposited thereon. Titanium was then deposited as for Catalyst Component F to obtain a catalyst containing 1.0% Cr and 3.7% Ti.

Catalyst Component H

The commercial chromium-containing catalyst employed for Catalyst Component D was additionally impregnated with aluminum using aluminum sec-butoxide and methylene chloride. The catalyst contained 1.0% Cr and 3.7% Al.

Catalyst Component I

The commercial chromium-containing catalyst employed for Catalyst Component D was modified with zirconium. The modification was accomplished by adding triisopropyl zirconate to a slurry of the chromium-containing catalyst in methylene chloride and evaporating the solvent. Chromium and zirconium contents were 1.0% and 3.7%, respectively.

Polymerizations for Examples V–XII were conducted in a one-liter autoclave equipped with a mechanical overhead stirrer and an external jacket for regulating temperature. The polymerization was performed by providing the continuous addition of ethylene at a fixed total pressure. The reactor had thermocouples to control the temperature of the external jacket and the internal temperature of the reactor during the polymerization. Ethylene fed to the reactor was passed through an electronic gas flow meter to permit continuous monitoring of the ethylene flow to the reactor. All handling of the polymerization reaction components was carried out using airless techniques to exclude oxygen and water. The polymerizations were conducted in a slurry of isobutane which had been dried and deoxygenated. The autoclave was charged first with catalyst and then with 450 ml isobutane. The autoclave was then heated and the introduction of ethylene was commenced when the desired temperature was reached.

EXAMPLE V

A mixed catalyst was prepared by combining Catalyst Component A (high pore volume) and Catalyst Component D (low pore volume) at a weight ratio of 1:1. The mixture was then activated by fluidizing with dry air at 2 feed per minute lineal velocity and heating at 1200° F. for 6 hours. The resulting mixed catalyst thus obtained was then evaluated for its ability to polymerize ethylene in accordance with the procedure described above. Two polymerizations, identified as Run A and Run B, were made and the conditions employed for each and results obtained were as follows:

|  | Run A | Run B |
|---|---|---|
| Temperature (°F.) | 221 | 221 |
| Other Pzn Variables | 8.5 | 8.5 |
| Polymer Recovered (grams) | 150 | 124 |
| Productivity[1] | 1194 | 2094 |
| Activity[2] | 3256 | 2417 |
| Resin Properties: |  |  |
| Density | .9554 | N.D.[3] |
| MI | 0.48 | 0.092 |
| HLMI | 35.9 | 11.5 |
| MIR | 74.8 | 124.6 |

[1]Grams polymer per gram of catalyst
[2]Grams polymer per gram of catalyst per hour
[3]N.D. = not determined

EXAMPLE VI

Three mixed catalysts were prepared by combining Catalyst Component A and Catalyst Component E at different weight ratios and used to polymerize ethylene. The mixed catalysts were activated at 1100° F. for 6 hours in air. Compositions of the mixed catalysts, details of the polymerizations and properties of the resins produced were as follows:

|  | Run A | Run B | Run C |
|---|---|---|---|
| Wt. Ratio A:E | 1:1 | 4:1 | 1:4 |
| Temperature (°F.) | 221 | 221 | 221 |
| Ethylene in Reactor (wt. %) | 8.5 | 8.5 | 8.5 |
| Polymer Recovered (grams) | 72 | 142 | 131 |
| Productivity | 1283 | 2178 | 2060 |
| Activity | 1426 | 2513 | 2247 |
| Resin Properties: | | | |
| Density | .9598 | .9591 | .9628 |
| MI | .74 | .19 | 1.14 |
| HLMI | 58.1 | 16.9 | 77.6 |
| MIR | 78.5 | 88.7 | 68.1 |

EXAMPLE VII

A mixed catalyst containing chromium, phosphorus and titanium was prepared by combining Catalysts Component F and Catalyst component B at a 1:1 wt. ratio. Two polymerizations were conducted using the mixed catalyst. For the first polymerization (Run A) the mixed catalyst was activated by heating in air at 1200° F. for 6 hours and for the second polymerization (Run B) the catalyst was activated in air at 1100° F. for six hours. Results were as follows:

|  | Run A | Run B |
|---|---|---|
| Temperature (°F.) | 221 | 221 |
| Ethylene in Reactor (wt. %) | 8.5 | 8.5 |
| Polymer Recovered (grams) | 138 | 135 |
| Productivity | 1618 | 2292 |
| Activity | 2489 | 2547 |
| Resin Properties: | | |
| Density | N.D. | .9548 |
| MI | 0.43 | 0.21 |
| HLMI | 36.8 | 16.3 |
| MIR | 85.6 | 77.7 |

EXAMPLE VIII

Mixed catalysts containing chromium, titanium, and aluminum obtained by combining higher pore volume based Catalyst Component G with lower pore volume based Catalyst Component H were prepared, activated in air at 1100° F. in the usual manner and evaluated for the polymerization of ethylene. Results were as follows:

|  | Run A | Run B |
|---|---|---|
| Wt. Ratio G:H | 1:1 | 4:1 |
| Temperature (°F.) | 221 | 221 |
| Ethylene in Reactor (%) | 8.5 | 8.5 |
| Polymer Recovered (grams) | 112 | 128 |
| Productivity | 2171 | 1960 |
| Activity | 2368 | 2330 |
| Resin Properties: | | |
| Density | .9595 | .9606 |
| MI | 0.68 | 1.10 |
| HLMI | 46.1 | 77.0 |
| MIR | 67.8 | 70 |

EXAMPLE IX

Mixed catalysts containing chromium, titanium, and boron were obtained by combining Catalyst Component G with Catalyst Component D. The mixed catalysts were activated at 1200° F. in the usual manner and used to polymerize ethylene. Results were as follows:

|  | Run A | Run B |
|---|---|---|
| Wt. Ratio G:D | 2:1 | 1:1 |
| Temperature (°F.) | 221 | 221 |
| Ethylene in Reactor (%) | 8.5 | 8.5 |
| Polymer Recovered (grams) | 132 | 114 |
| Productivity | 1803 | 1344 |
| Activity | 3381 | 1753 |
| Resin Properties: | | |
| Density | N.D. | .9585 |
| MI | 1.0 | 1.25 |
| HLMI | 58.1 | 90.9 |
| MIR | 58.1 | 72.7 |

EXAMPLE X

To further demonstrate the versatility of the invention and the ability to vary resin properties by changing the activation conditions, the following experiment was conducted. For this example the mixed catalyst of Example VI, comprised of a mixture of one part Catalyst Component A (chromium, aluminum and phosphorous on higher pore volume silica) and one part Catalyst Component E (chromium and titanium on lower pore volume silica), was activated utilizing a multiple step procedure. The activation procedure entailed: (a) heating the mixed catalyst to approximately 300° F. under nitrogen over a one hour period; (b) maintaining the mixed catalyst at 300° F. for two hours under nitrogen; (c) gradually increasing the temperature of the mixed catalyst to 1290° F. over a 6 hour period under an atmosphere of carbon monoxide and nitrogen (wt. ratio 3:97); (d) maintaining the mixed catalyst at 1290° F. for 6 hours under the $CO/N_2$ atmosphere; (e) cooling the mixed catalyst to 930° F. over a 2 hour period under nitrogen; (f) heating the mixed catalyst for one hour in air at 930° F.; and (g) cooling the mixed catalyst to ambient temperature over a period of 5 hours under nitrogen. The total time required for this activation procedure was 23 hours.

The mixed catalyst activated in the above manner was employed for the polymerization of ethylene. Polymerization conditions and properties of the resulting resin were as follows:

|  | Run A | Run B |
|---|---|---|
| Temperature (°F.) | 214 | 201 |
| Ethylene in Reactor (%) | 5 | 5 |
| Polymer Recovered (grams) | 93 | 119 |
| Productivity | 1970 | 1653 |
| Activity | 1970 | 1417 |
| Resin Properties: | | |
| Density | .9619 | .9625 |
| MI | 0.52 | 0.08 |
| HLMI | 45.8 | 11.8 |
| MIR | 88 | 147.5 |

EXAMPLE XI

Utilizing the activation procedure of Example X, a mixed catalyst obtained by combining two parts Catalyst Component A with one part Catalyst Component E was prepared and used to polymerize ethylene. Results were as follows:

|  |  |
|---|---|
| Temperature (°F.) | 212 |

| | |
|---|---|
| Ethylene in Reactor (%) | 5 |
| Polymer Recovered (grams) | |
| Productivity | 1918 |
| Activity | 2131 |
| Resin Properties | |
| Density | .9604 |
| MI | 0.105 |
| HLMI | 17.8 |
| MIR | 169.5 |

EXAMPLE XII

A mixed catalyst containing chromium, aluminum, phosphorus and zirconium was prepared by combining Catalyst Component A and Catalyst Component I at a 1:1 ratio. The mixed catalyst was then activated following the procedure of Example X and employed for the polymerization of ethylene. Polymerization conditions employed and resin properties were as follows:

| | |
|---|---|
| Temperature (°F.) | 212 |
| Ethylene in Reactor (%) | 5 |
| Polymer Recovered (grams) | 102 |
| Productivity | 1977 |
| Activity | 2118 |
| Resin Properties: | |
| Density | .9603 |
| MI | 0.02 |
| HLMI | 7.5 |
| MIR | 375 |

We claim:

1. A mixed chromium catalyst composition consisting essentially of a first and second silica-supported chromium catalyst component; said first and second catalyst components present at a weight ratio from 10:1 to 1:10 and each component containing from 0.1 to 2.0 weight percent chromium and thermally activated by heating in a non-reducing atmosphere at a temperature from 450° F. to 1700° F. with at least one of said catalyst components containing an additional metallic or non-metallic element selected from aluminum, titanium, zirconium, boron or phosphorus; and the silica supports of said first and second catalyst components differing in pore volume by at least 0.3 cc/g.

2. The mixed chromium catalyst composition of claim 1 wherein the weight ratio of the first and second catalyst components is from 5:1 to 1:5 and the pore volume of the silica support of the first catalyst component is greater than 1.0 cc/g and at least 0.3 cc/g higher than the pore volume of the silica support of the second catalyst component.

3. The mixed chromium catalyst composition of claim 2 wherein the pore volume of the silica support of the first catalyst component is from 1.7 to 3.1 cc/g and the pore volume of the silica support of the second catalyst component is from 1.0 to 2.0 cc/g.

4. The mixed chromium catalyst composition of claim 3 wherein either or both of the silica supports employed for the first and second catalysts components is calcined at a temperature from 200° F. to 1800° F. prior to metal deposition.

5. The mixed chromium catalyst composition of claim 3 wherein the metallic or non-metallic element is present in an amount from 0.1 to 6.0 weight percent.

6. The mixed chromium catalyst composition of claim 5 wherein the first catalyst component contains 0.5 to 1.2 weight percent chromium and the second catalyst component contains 0.75 to 1.25 weight percent chromium.

7. The mixed chromium catalyst composition of claim 6 wherein 2 to 4.5 weight percent aluminum is additionally present.

8. The mixed chromium catalyst composition of claim 7 wherein the aluminum is associated with the first catalyst component.

9. The mixed chromium catalyst composition of claim 7 wherein there is additionally present 0.1 to 1.0 weight percent phosphorus.

10. The mixed chromium catalyst composition of claim 8 wherein prior to thermal activation in the non-reducing atmosphere the first catalyst component, the second catalyst component or a mixture of the first and second catalyst components is heated in a reducing atmosphere at 575° F. to 1650° F.

11. The mixed chromium catalyst composition of claim 10 wherein the reducing atmosphere is a mixture of nitrogen and carbon monoxide.

12. The mixed chromium catalyst composition of claim 8 wherein a metallic or non-metallic reducing agent is present and the molar ratio of the metal or non-metal of said reducing agent to chromium ranges from 0.01:1 to 5:1.

13. The mixed chromium catalyst composition of claim 12 wherein the metallic or non-metallic reducing agent is selected from the group consisting of trialkyl aluminums, alkyl aluminum halides, alkyl aluminum alkoxides, dialkyl zincs, dialkyl magnesiums, alkali metal borohydrides, aluminum borohydrides, alkyl boranes, and boron hydrides.

14. The mixed chromium catalyst composition of claim 13 wherein the reducing agent is triethyl borane.

15. The mixed chromium catalyst composition of claim 6 wherein 2 to 4.5 weight percent titanium is additionally present.

16. The mixed chromium catalyst composition of claim 15 wherein the titanium is associated with the first catalyst component.

17. The mixed chromium catalyst composition of claim 15 wherein there is additionally present 0.1 to 1.0 weight percent phosphorus.

18. The mixed chromium catalyst composition of claim 16 wherein prior to thermal activation in the non-reducing atmosphere the first catalyst component, the second catalyst component or a mixture of the first and second catalyst components is heated in a reducing atmosphere at 575° F. to 1650° F.

19. The mixed chromium catalyst composition of claim 18 wherein the reducing atmosphere is a mixture of nitrogen and carbon monoxide.

20. The mixed chromium catalyst composition of claim 16 wherein a metallic or non-metallic reducing agent is present and the molar ratio of the metal or non-metal of said reducing agent to chromium ranges from 0.01:1 to 5:1.

21. The mixed chromium catalyst composition of claim 20 wherein the metallic or non-metallic reducing agent is selected from the group consisting of trialkyl aluminums, alkyl aluminum halides, alkyl aluminum alkoxides, dialkyl zincs, dialkyl magnesiums, alkali metal borohydrides, aluminum borohydrides, alkyl boranes, and boron hydrides.

22. The mixed chromium catalyst composition of claim 21 wherein the reducing agent is triethyl borane.

23. The mixed chromium catalyst composition of claim 6 wherein 2 to 4.5 weight percent zirconium is additionally present.

24. The mixed chromium catalyst composition of claim 23 wherein there is additionally present 0.1 to 1.0 weight percent phosphorus.

25. The mixed chromium catalyst composition of claim 23 wherein the zirconium is associated with the first catalyst component.

26. The mixed chromium catalyst composition of claim 25 where in prior to thermal activation in the non-reducing atmosphere the first catalyst component, the second catalyst component or a mixture of the first and second catalyst components is heated in a reducing atmosphere at 575° F. to 1650° F.

27. The mixed chromium catalyst composition of claim 26 wherein the reducing atmosphere is a mixture of nitrogen and carbon monoxide.

28. The mixed chromium catalyst composition of claim 25 wherein a metallic or non-metallic reducing agent is present and the molar ratio of the metal or non-metal of said reducing agent to chromium ranges from 0.01:1 to 5:1.

29. The mixed chromium catalyst composition of claim 26 wherein the metallic or non-metallic reducing agent is selected from the group consisting of trialkyl aluminums, alkyl aluminum halides, alkyl aluminum alkoxides, dialkyl zincs, dialkyl magnesiums, alkali metal borohydrides, aluminum borohydrides, alkyl boranes, and boron hydrides.

30. The mixed chromium catalyst composition of claim 29 wherein the reducing agent is triethyl borane.

* * * * *

UNITED STATES PATENT AND TRADEMARK OFFICE
CERTIFICATE OF CORRECTION

PATENT NO. : 5,198,400
DATED : March 30, 1993
INVENTOR(S) : Stanley J. Katzen; Thomas J. Pullukat; Michael W. Lynch

It is certified that error appears in the above-indentified patent and that said Letters Patent is hereby corrected as shown below:

Column 16, line 9, "triisopropyl" should read --tetraisopropyl--.

Column 19, line 60, "catalysts" should read --catalyst--.

Signed and Sealed this

Twenty-fifth Day of January, 1994

Attest:

BRUCE LEHMAN

*Attesting Officer*    *Commissioner of Patents and Trademarks*